United States Patent
Peng et al.

(10) Patent No.: US 8,787,011 B2
(45) Date of Patent: Jul. 22, 2014

(54) MOUNTING APPARATUS FOR EXPANSION CARD

(75) Inventors: Qiu-Hua Peng, Wuhan (CN); Rong-Rong Song, Wuhan (CN); Li Wang, Wuhan (CN)

(73) Assignees: Hong Fu Jin Precision Industry (WuHan) Co., Ltd., Wuhan (CN); Hon Hai Precision Industry Co., Ltd., New Taipei (TW)

( * ) Notice: Subject to any disclaimer, the term of this patent is extended or adjusted under 35 U.S.C. 154(b) by 162 days.

(21) Appl. No.: 13/495,187

(22) Filed: Jun. 13, 2012

(65) Prior Publication Data
US 2013/0155602 A1    Jun. 20, 2013

(30) Foreign Application Priority Data
Dec. 17, 2011 (CN) .......................... 2011 1 0423657

(51) Int. Cl.
*G06F 1/16* (2006.01)
(52) U.S. Cl.
USPC ............ 361/679.32; 248/343; 455/575.8; 439/485
(58) Field of Classification Search
USPC ............. 248/221.11, 560, 27.1, 68.1, 284.1, 248/27.3, 615, 220.1, 222.11, 352, 585, 248/343; 361/679.28, 679.32, 679.48, 361/679.33, 679.4, 679.31, 679.58, 679.01, 361/679.38, 679.39, 679.41, 679.55, 361/679.47, 679.5, 679.37, 679.02, 679.6; 455/558, 557, 575.8; 439/527, 653, 439/215, 377, 327, 59, 485, 668; 312/327, 312/223.1, 223.2, 351.1, 265.5, 332.1, 312/257.1

See application file for complete search history.

(56) References Cited

U.S. PATENT DOCUMENTS

| | | | |
|---|---|---|---|
| 2008/0212295 A1* | 9/2008 | Xiao | 361/759 |
| 2009/0073666 A1* | 3/2009 | Tsai et al. | 361/740 |
| 2011/0290972 A1* | 12/2011 | Chen et al. | 248/309.1 |

FOREIGN PATENT DOCUMENTS

| | | |
|---|---|---|
| CN | 202026535 U | 11/2011 |
| TW | 377844 | 12/1999 |
| TW | M284022 | 12/2005 |
| TW | M318303 | 3/2007 |

* cited by examiner

*Primary Examiner* — Hung Duong
(74) *Attorney, Agent, or Firm* — Novak Druce Connolly Bove + Quigg LLP

(57) ABSTRACT

A mounting apparatus includes a chassis and a mounting piece. The chassis includes a rear plate. An expansion slot is defined in the rear plate, and a clipping portion extends from an edge of the expansion slot. The mounting piece includes a main body, an engaging piece extending from a first end of the main body, and an inserting portion extending from a second opposite end of the main body. The engaging piece defines a clipping slot, and two blocking portions are located on the opposite side of entrance of the clipping slot. The clipping portion is engaged in the clipping slot, and the two blocking portions prevent the clipping portion from being disengaged from the clipping slot.

18 Claims, 5 Drawing Sheets

“MOUNTING APPARATUS FOR EXPANSION CARD

BACKGROUND

1. Technical Field

The present disclosure relates to mounting apparatuses, more particularly to a mounting apparatus for an expansion card.

2. Description of Related Art

A computer system usually includes expansion cards, such as sound cards, video cards, graphics cards, etc., for enhancing the capabilities of the computer system. The expansion cards are often mounted to a computer casing of the computer system with screws. However, using screws to attach the expansion cards is laborious and time consuming. Therefore, an improved mounting apparatus may be needed within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
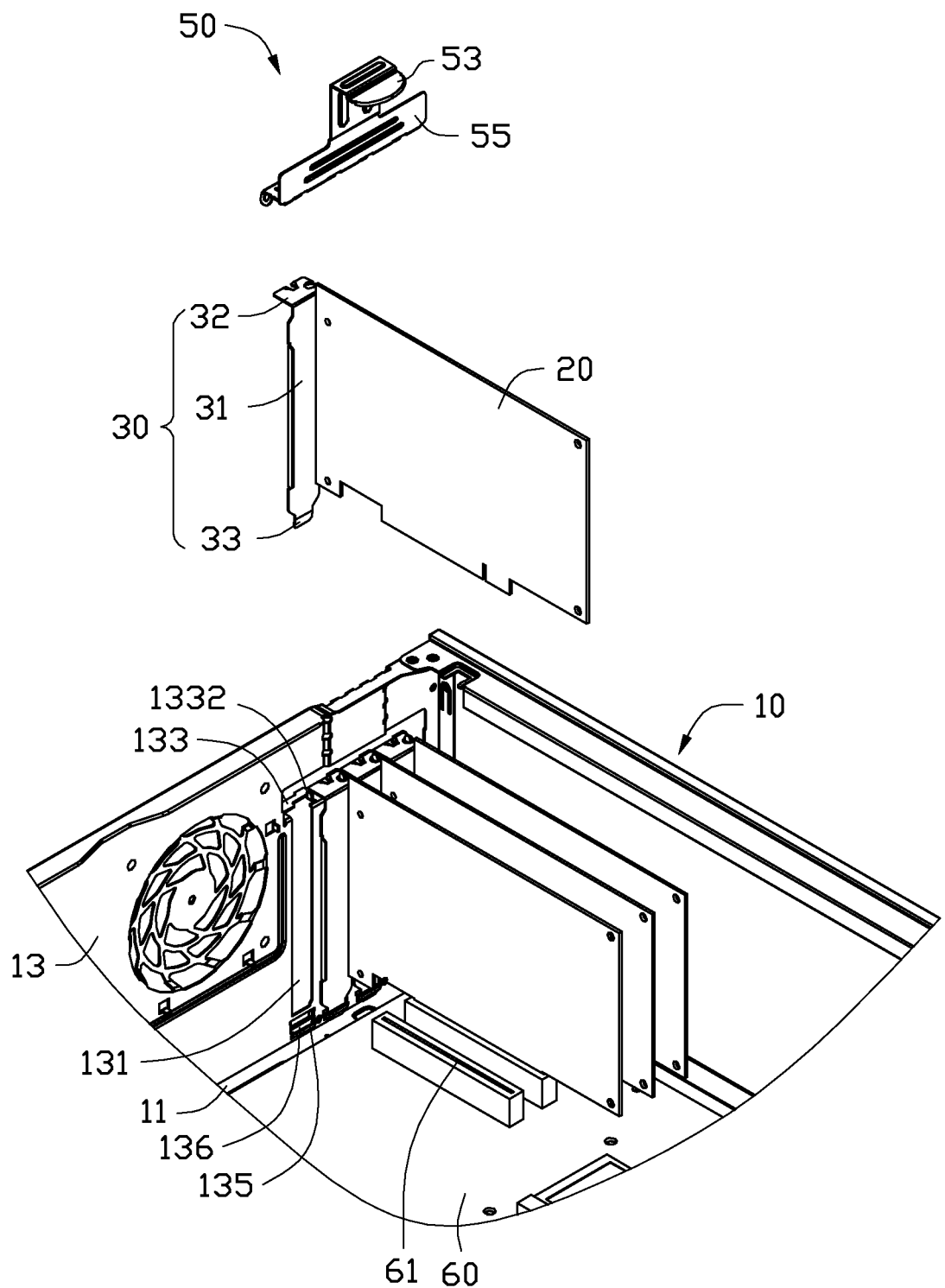
FIG. 1 is an exploded, isometric view of a mounting apparatus in accordance with an embodiment.
Figure 2:
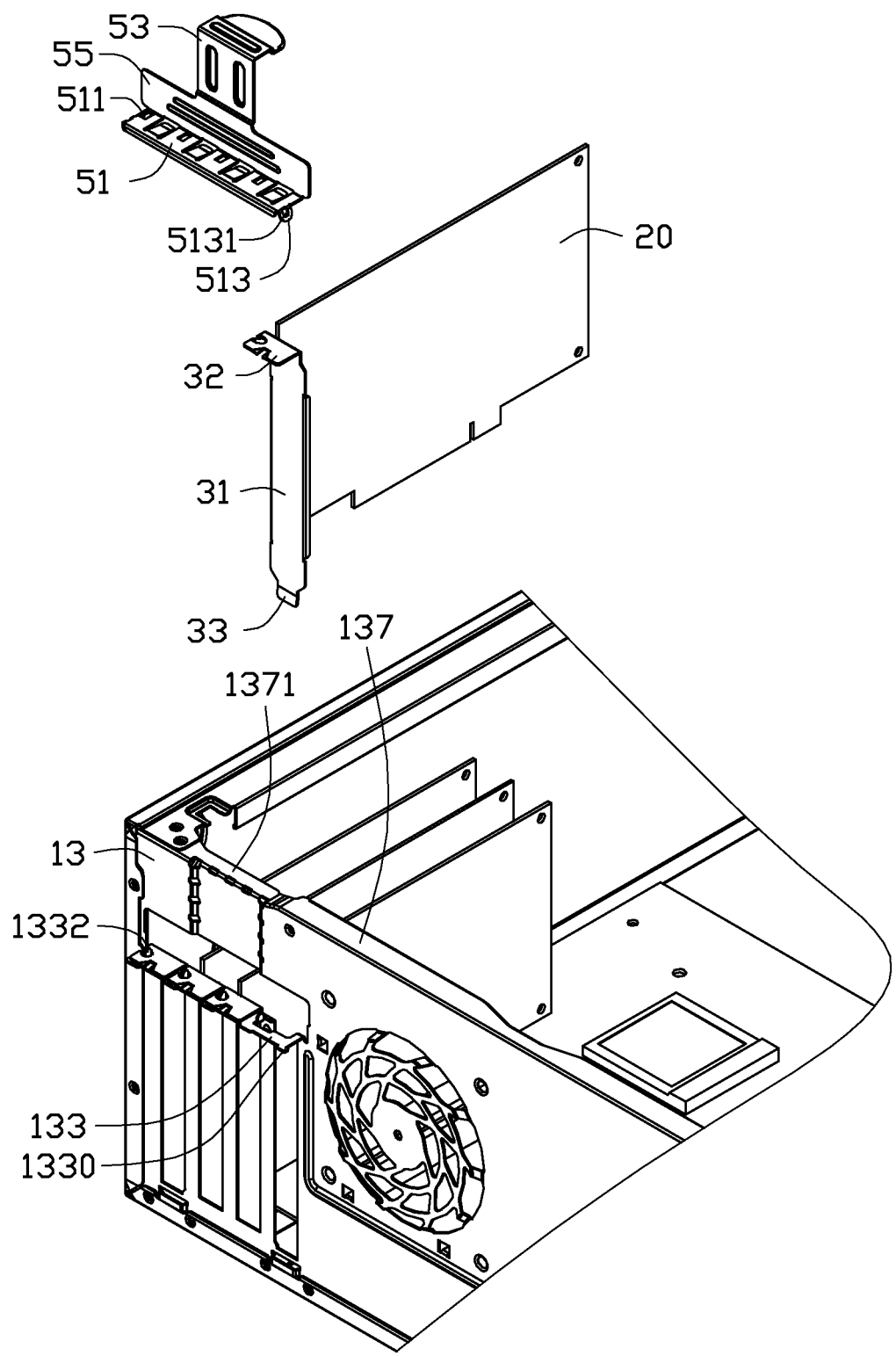
FIG. 2 is similar to FIG. 1, but viewed from a different aspect.
Figure 3:
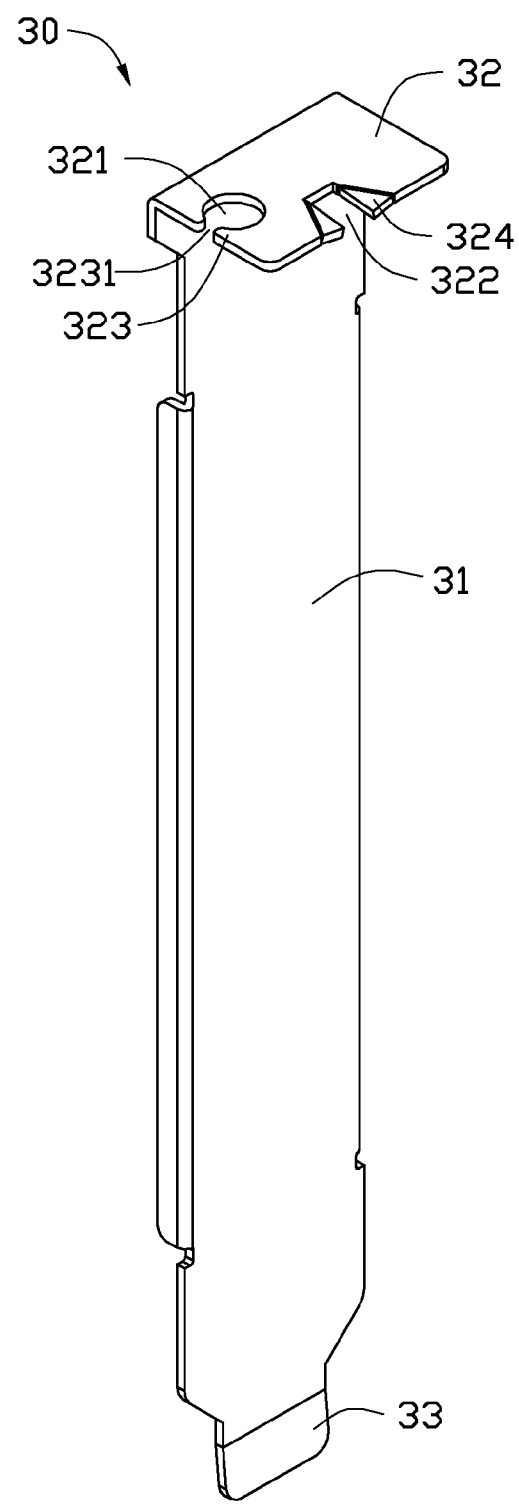
FIG. 3 is an isometric view of a mounting piece of the mounting apparatus of FIG. 1.

Referring to FIGS. 1 and 2, a mounting apparatus in accordance with an embodiment includes a chassis 10; a mounting piece 30, adapted for attaching to an expansion card 20; and a resisting member 50. In one embodiment, the expansion card 20 may be, for example, one or more sound cards, video cards, or graphics cards, or other peripheral component interconnection cards.

The chassis 10 includes a bottom plate 11 and a rear plate 13 extending from an edge of the bottom plate 11. In one embodiment, the rear plate 13 is substantially perpendicular to the bottom plate 11. A motherboard 60 is attached to the bottom plate 11. A plurality of inserting slots 61 are located on the motherboard 60. A plurality of expansion slots 131 are defined in the rear plate 13, and a supporting panel 133 is located on the plurality of expansion slots 131. The supporting panel 133 includes two pivoting portions 1330 and a plurality of clipping portions 1332. The two pivoting portions 1330 are located on opposite sides of the supporting panel 133. The plurality of clipping portions 1332 are located on a top surface of the supporting panel 133, and each of the plurality of clipping portions 1332 is pointed towards each of the plurality of expansion slots 131. Each of the plurality of clipping portions 1332 is substantially perpendicular to the supporting panel 133. A plurality of mounting portions 135 protrude from the rear plate 13, and a mounting slot 136 is defined in each of the plurality of mounting portions 135. A flange 137 extends from a top portion of the rear plate 13, and a receiving portion 1371 is defined in the flange 137.

The mounting piece 30 includes a main body 31, an engaging piece 32 extending from a first end of the main body 31, and an inserting portion 33 extending from a second end of the main body 31. A clipping slot 321 and a cutout 322 are defined in the engaging piece 32. The clipping slot 321 extends from a first edge of the engaging piece 32, and the cutout 322 extends from a second edge of the engaging piece 32. Two elastic blocking portions 323, are located on the entrance of the clipping slot 321, and define a gap 3231 between the two blocking portions 323. The gap 3231 is less than a width of the clipping portion 1332. In one embodiment, the clipping slot 321 is round, and a diameter of the clipping slot 321 is greater than the gap 3231. Two abutting pieces 324 are located on opposite sides of the cutout 322 and provide for electromagnetic interference (EMI) protection. In one embodiment, each of the abutting pieces 324 is a triangle.

The resisting member 50 includes a resisting panel 51, an operating panel 53, and a connecting panel 55 connected to the resisting panel 51 and the operating panel 53. The resisting panel 51 defines a plurality of receiving slots 511 and two pivoting pieces 513, extending from the opposite ends of the resisting panel 51. A pivoting hole 5131 is defined in each of the two pivoting pieces 513. In one embodiment, the connecting panel 55 is substantially perpendicular to the resisting panel 51.

Figure 4:
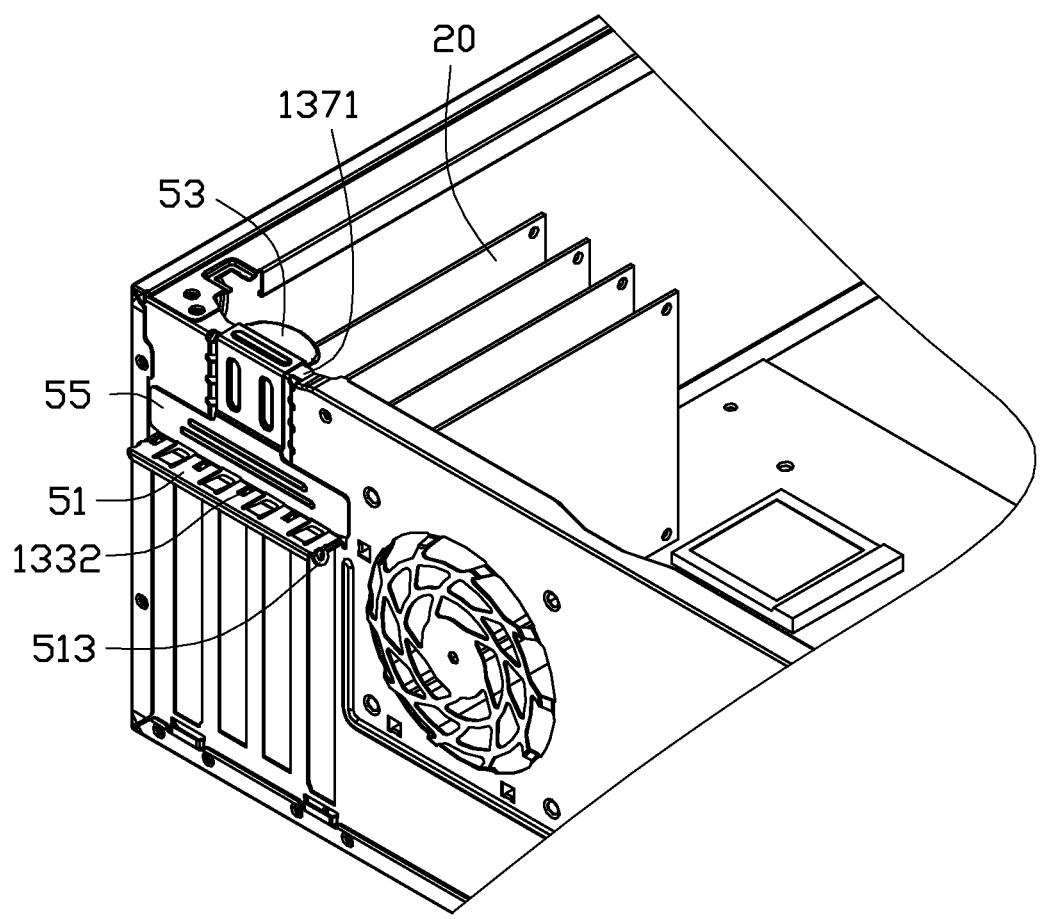
FIG. 4 is an assembled view of the mounting apparatus of FIG. 1.
Figure 5:
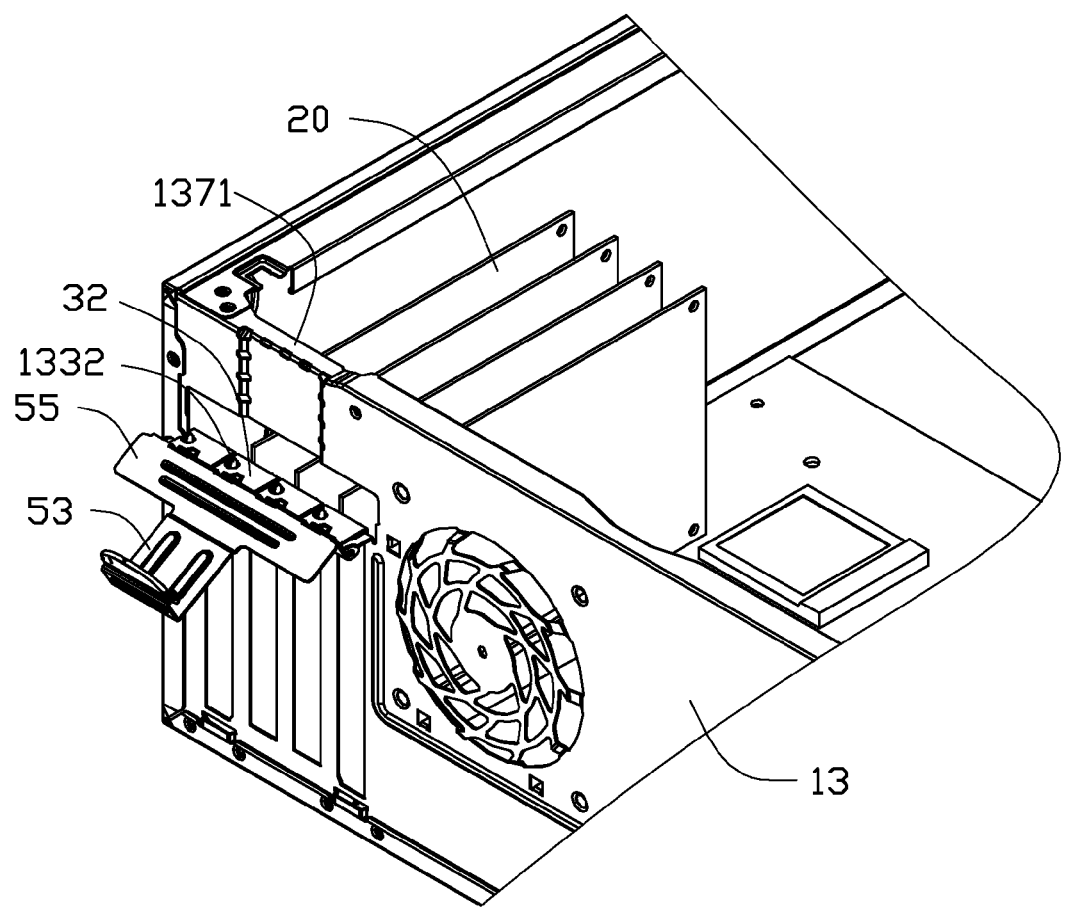
FIG. 5 is similar to FIG. 1, but viewed from a different aspect.

Referring to FIGS. 4-5, in assembly, the resisting member 50 abuts the outside of the rear plate 13. The two pivoting portions 1330 are engaged in the two pivoting holes 5131, to rotatably secure the resisting member 50 to the supporting panel 133. The inserting portion 33 is inserted into the mounting slot 136. At this point, the two blocking portions 323 abut the clipping portion 1332. The mounting piece 30 is pressed, and the clipping portion 1332 urges the two blocking portions 323 to deform in opposite directions. Thus, the clipping portion 1332 can extend through the gap 3231 to engage in the clipping slot 321. Then, the two blocking portions 323 are released to prevent the clipping portion 1332 from disengaging from the clipping slot 321. The resisting member 50 is rotated about the pivoting portion 1330, until the resisting panel 51 abuts the supporting panel 133 and the clipping portion 1332 is engaged in the receiving slot 511. At this point, the connecting panel 55 abuts the rear plate 13, and the operating panel 53 is positioned in the receiving portion 1371.

In disassembly, the resisting member 50 is moved away from the rear plate 13, until the clipping portion 1332 is disengaged from the receiving slot 511. The inserting portion 33 is removed from the mounting slot 136. The mounting piece 30 is moved away from the clipping portion 1332, and the two blocking portions 323 are deformed in the opposite direction. Thus, the clipping portion 1332 can be detached from the clipping slot 321. The mounting piece 30 is moved, and the expansion card 20 is removed from the chassis 10.

In another embodiment, in assembly, the resisting member 50 abuts the outside of the rear plate 13. The two pivoting portions 1330 are engaged in the two pivoting holes 5131, to rotatably secure the resisting member 50 to the supporting panel 133. The engaging piece 32 is above the supporting panel 133, and the clipping slot 321 is aligned with the clipping portion 1332. The mounting piece 30 is moved in a direction substantially perpendicular to the bottom plate 11, and the clipping portion 1332 is thus engaged in the clipping slot 321. The inserting portion 33 is inserted into the mounting slot 136, and the mounting piece 30 is secured to the rear plate 13. The gap 3231 is less than the width of the clipping portion 1332, and the two blocking portions 323 can prevent the clipping portion 1332 from being disengaged from the clipping slot 321. The resisting member 50 is rotated towards the rear plate 13, until the resisting panel 51 abuts the supporting panel 133. The clipping portion 1332 is received in the receiving slot 511. At this point, the connecting panel 55 abuts the rear plate 13, and the operating panel 53 is positioned in the receiving portion 1371.

In disassembly, the resisting member 50 is rotated away from the rear plate 13, until the clipping portion 1332 is removed from the receiving slot 511. The mounting piece 30 is moved upwards, the clipping portion is disengaged from the clipping slot 321, and the inserting portion 33 is disengaged from the mounting slot 136. The mounting piece 30 is moved, and the expansion card 20 is removed from the chassis 10.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A mounting apparatus comprising:
    a chassis comprising a rear plate; an expansion slot defined in the rear plate, and a clipping portion extending from an edge of the expansion slot; and
    a mounting piece, configured to be attached to an expansion card, comprising a main body, an engaging piece extending from a first end of the main body, and an inserting portion extending from a second opposite end of the main body; the engaging piece defining a clipping slot, and two blocking portions located on opposite sides of entrance of the clipping slot;
    wherein the clipping portion is engaged in the clipping slot, and the two blocking portions prevent the clipping portion from being disengaged from the clipping slot.

2. The mounting apparatus of claim 1, wherein the clipping portion is a piece, a gap is defined between the two blocking portions, and the gap is less than a width of the clipping portion.

3. The mounting apparatus of claim 2, wherein the clipping slot is round, and the gap is less than a diameter of the clipping slot.

4. The mounting apparatus of claim 1, wherein a supporting panel is located on the rear plate, and the clipping portion is substantially perpendicular to the supporting panel.

5. The mounting apparatus of claim 4, wherein a mounting portion is located on the rear plate and extends towards the interior of the chassis, and a mounting slot is defined between the mounting portion and the rear plate.

6. The mounting apparatus of claim 4, further comprising a resisting member rotated attached to the supporting panel, and the resisting member is configured to prevent the engaging piece from being disengaged from the supporting panel.

7. The mounting apparatus of claim 6, wherein the resisting member comprises a resisting panel abutting the supporting panel, the resisting panel defines a receiving slot, and the clipping portion is received in the receiving slot.

8. The mounting apparatus of claim 7, wherein the resisting member further comprises a connecting panel that is substantially perpendicular to the resisting panel, and the connecting panel abuts the rear plate.

9. The mounting apparatus of claim 8, wherein the resisting member further comprises an operating panel connected to the connecting panel, the rear plate comprises a flange, and the flange defines a receiving portion engaged with the operating panel.

10. The mounting apparatus of claim 1, wherein the engaging piece defines a cutout, two abutting pieces are attached to opposite edges of the cutout and provide electromagnetic interference protection, and each of the two abutting pieces is a triangle.

11. A mounting apparatus comprising:
    a chassis comprising a rear plate; an expansion slot defined in the rear plate; a supporting panel located on the rear plate, and the supporting panel comprising a clipping portion extending from an edge of the expansion slot;
    a mounting piece, configured to be attached to an expansion card, comprising a main body, an engaging piece extending from a first end of the main body, and an inserting portion extending from a second opposite end of the main body; the engaging piece defining a clipping slot, and two blocking portions located on opposite sides of entrance of the clipping slot; and
    a resisting member rotatably attached to the supporting panel and adapted to prevent the engaging piece from being disengaged from the supporting panel; a receiving slot defined in the resisting member;
    wherein the clipping portion is engaged in the clipping slot and the receiving slot, and the two blocking portions prevent the clipping portion from being disengaged from the clipping slot.

12. The mounting apparatus of claim 11, wherein the clipping portion is a piece, a gap is defined between the two blocking portions, and the gap is less than a width of the clipping portion.

13. The mounting apparatus of claim 12, wherein the clipping slot is round, and the gap is less than a diameter of the clipping slot.

14. The mounting apparatus of claim 11, wherein the clipping portion is substantially perpendicular to the supporting panel.

15. The mounting apparatus of claim 11, wherein a mounting portion is located on the rear plate and extends towards the interior of the chassis, and a mounting slot is defined between the mounting portion and the rear plate.

16. The mounting apparatus of claim 11, wherein the resisting member comprises a resisting panel abutting the supporting panel and a connecting panel substantially that is perpendicular to the resisting panel, and the connecting panel abuts the rear plate.

17. The mounting apparatus of claim 16, wherein the resisting member further comprises an operating panel connected to the connecting panel, the rear plate comprises a flange, and the flange defines a receiving portion engaged with the operating panel.

18. The mounting apparatus of claim 11, wherein the engaging piece defines a cutout, two abutting pieces are attached to opposite edges of the cutout and provide electromagnetic interference protection, and each of the two abutting pieces is a triangle.

* * * * *